United States Patent [19]
Champlin

[11] 3,909,708
[45] Sept. 30, 1975

[54] ELECTRONIC BATTERY TESTING DEVICE

[76] Inventor: Keith S. Champlin, 5437 Elliot Ave., South, Minneapolis, Minn. 55417

[22] Filed: Jan. 2, 1974

[21] Appl. No.: 430,254

[52] U.S. Cl. ............................................. 324/29.5
[51] Int. Cl.² ........................................ G01N 27/42
[58] Field of Search .................................. 324/29.5

[56] References Cited
UNITED STATES PATENTS

| | | | |
|---|---|---|---|
| 2,514,745 | 7/1950 | Dalzell | 324/29.5 X |
| 3,753,094 | 8/1973 | Furuishi et al. | 324/29.5 |

OTHER PUBLICATIONS

Willihnganz E., "Battery Impedance" Electrical Engineering Vol. 78, No. 9, Sept. 1959, pp. 922–925.
Hambuechen, C., "Performance of Dry Cells," Preprint of Am. Electrochem. Soc., Apr. 18–20, 1912, paper No. 19.

*Primary Examiner*—Alfred E. Smith
*Assistant Examiner*—Rolf Hille
*Attorney, Agent, or Firm*—James W. Gillman; Donald J. Lisa

[57] ABSTRACT

An improved self-contained electronic device for testing storage batteries and other dc sources is disclosed. The testing device is electrically connected to the battery by means of temporary spring clips. Adjustments are set to the particular electrical rating and temperature of the battery. The device then employs small-signal dynamic measurements to determine whether or not the battery is capable of delivering a specified amount of power dictated by the battery's rating and temperature. The invention thus provides simple "pass-fail" information just as does a conventional load test apparatus but without the disadvantages of the latter.

23 Claims, 5 Drawing Figures

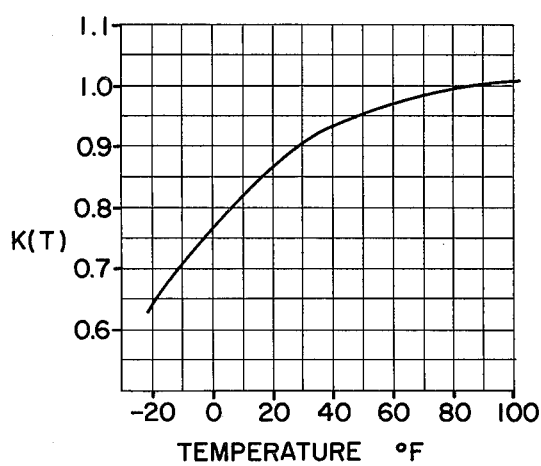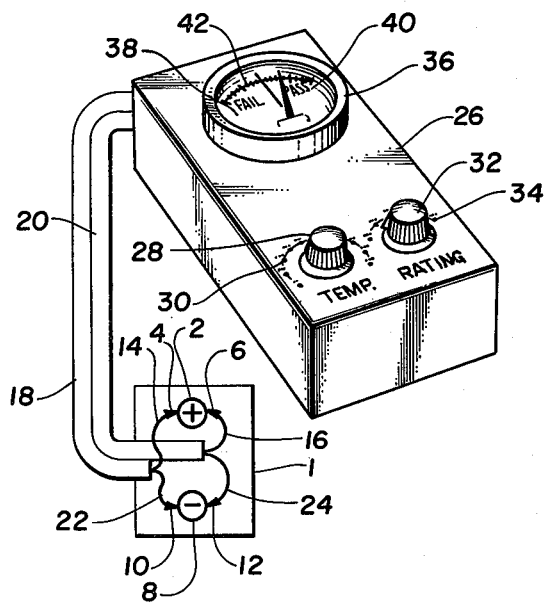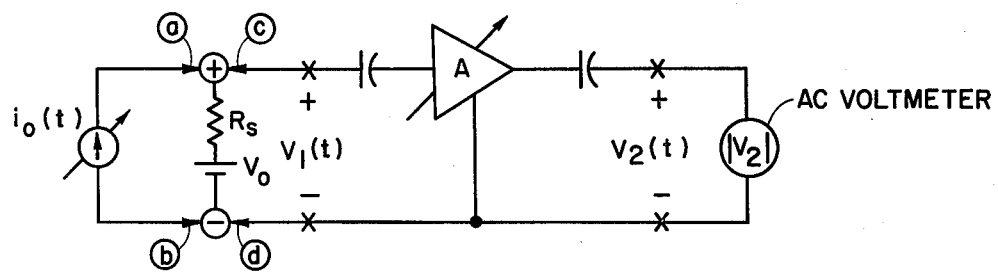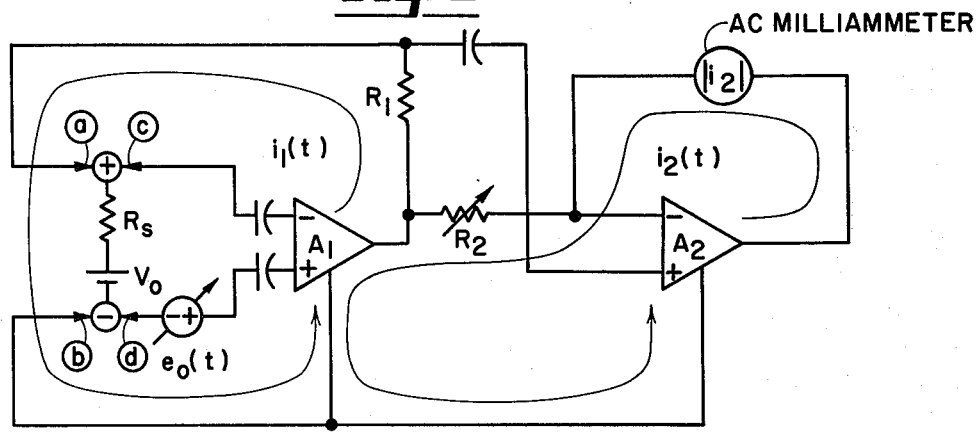

ELECTRONIC BATTERY TESTING DEVICE

This invention relates to an electonic measuring device for assessing the ability of a storage battery or other dc source of electricity to deliver a specified amount of power to a load. More specifically, it relates to improved apparatus of the type disclosed in the Patent Application titled ELECTRONIC BATTERY TESTING DEVICE; filed Sept. 14, 1971, Ser. No. 180,340, now abandoned; and in Continuation Application, Ser. No. 334,667, filed Feb. 22, 1973.

Storage batteries are employed in many applications requiring electrical energy to be retained for later use. Most commonly, they are employed in motor vehicles utilizing internal combustion engines. In such applications, energy stored by "charging" the battery during engine operation is later used to power lights, radio, and other electrical equipment when the engine is stopped.

The most severe demand upon the battery in a motor vehicle is generally made by the self-starter. Typically, several kilowatts of power are required by the starting motor to crank the engine. Failure to satisfactorily accomplish this task, particularly in cold weather, is usually the first indication of battery deterioration or trouble with the charging system. Clearly, a simple measurement that accurately assesses the battery's ability to supply cranking power is of considerable value.

In the past, a battery's ability to supply power to a load has been routinely assessed by means of a load test. In a load test, one subjects the battery to a heavy dc load having a predetermined value dictated by the battery's electrical rating and temperature. After a prescribed number of seconds, the battery's terminal voltage is observed under load, and the battery is then considered to have "passed" or "failed" the load test according to whether the voltage is greater than, or less than, a prescribed value. The battery's capability is thus qualitatively assessed on a strictly pass-fail basis.

Although the load test just described has been an accepted procedure for many years, it has a number of disadvantages because:

1. The currents drawn are large, thus requiring equipment which is heavy and cumbersome.
2. The test removes considerable energy from the battery.
3. Accurate measurements require great skills on the past of the operator since the terminal voltage drops continually with time under the influence of the heavy load.
4. Results of a load test are usually not immediately repeatable since the test itself polarizes the battery.

The present invention likewise provides pass-fail information concerning the battery's power delivering capability but does not suffer from the above disadvantages. The invention embodies an improved electronic device that functions on an entirely different principle from a load tester apparatus. Instead of drawing a large static current, a small, time-varying signal of appropriate frequency is employed to sense and measure the battery's dynamic conductance. This quantity is directly proportional to the battery's dynamic power, i.e. the maximum power that is instantaneously available at the terminals for delivery to a "matched" load. Electrical circuitry in the invention providess means for including the battery's electrical rating and temperature as variables. The invention includes means for indicating directly whether the battery's dynamic power is greater, or less, than a predetermined valve dictated by the battery's rating and temperature. In this manner, simple pass-fail information is obtained, just as with a load test; but without the disadvantages associated with the load test.

The principal object of the present invention is to provide a self-contained electronic instrument for ascertaining whether or not a given battery can supply a predetermined amount of power, said amount being representative of the battery's electrical rating and temperature.

A further object of this invention is to provide an instrument that will not appreciably perturb the battery being tested.

It is another object of this invention to provide an instrument of the type described above that requires neither special training nor particular skill on the part of the operator to obtain reproducible and accurate results.

It is a further object of this invention to provide a device including an instrument giving a comparison of the direct reading of the dynamic power of a battery under test to its electrical rating.

These and other objects will become apparent from a reading of the following description together with the attached drawings wherein:

FIG. 1 is a graph of the normalized variation of dynamic power as a function of temperature.

FIG. 2 is a simplified schematic diagram of a first embodiment of the improved electronic battery testing device.

FIG. 3 is a simplified and theoretical schematic diagram of the preferred embodiment of the improved electronic battery testing device.

FIG. 4 is an external diagrammatic view of the preferred embodiment of the improved electronic battery testing device.

Figure 5:
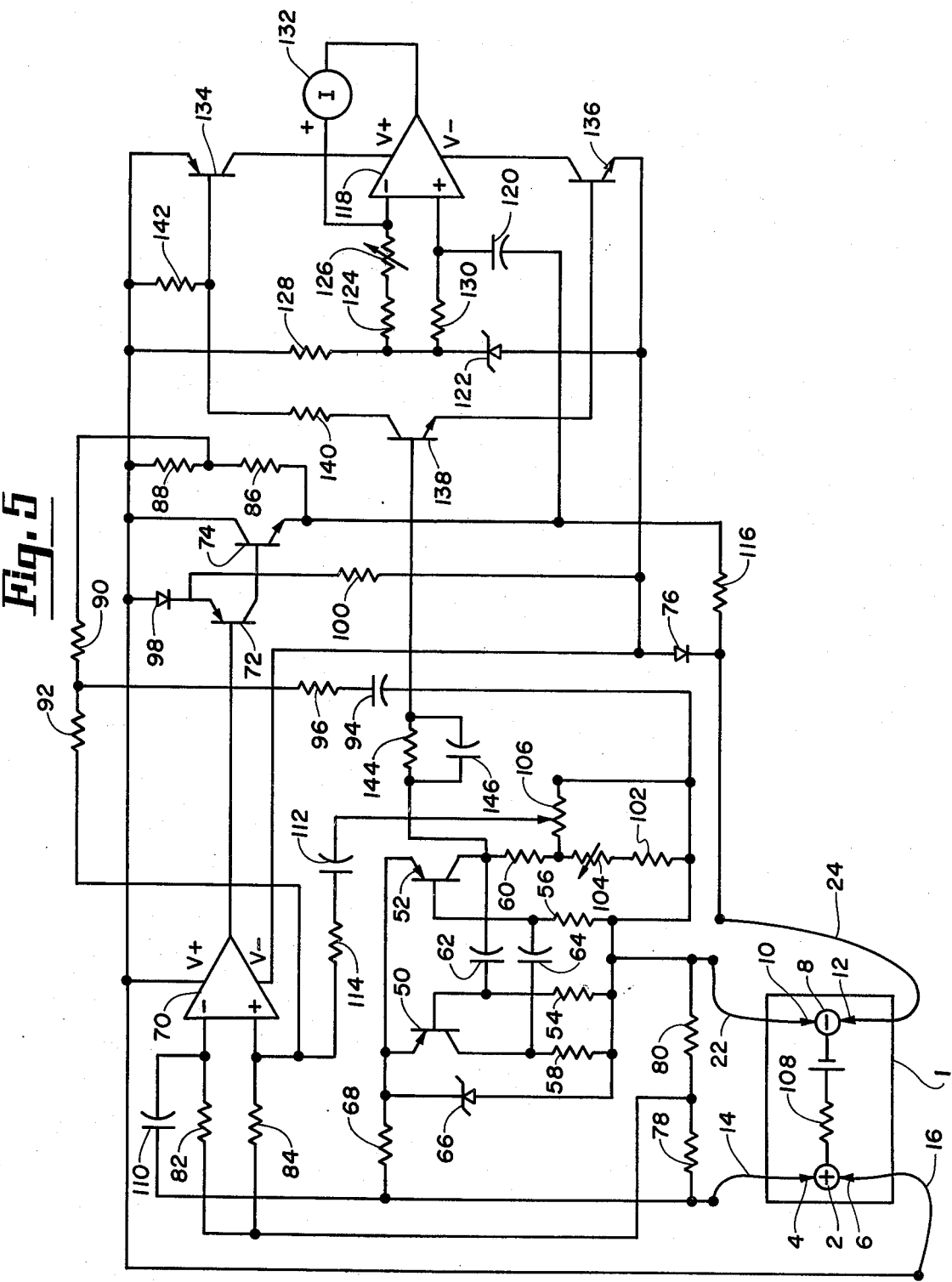
FIG. 5 is a complete schematic diagram of the preferred embodiment of the improved electronic battery testing device.

The dynamic power $P_d$ of a battery, has been defined in Patent Application Ser. No. 180,340 and Continuation Application Ser. No. 334,667. Physically, this quantity represents the maximum pulse power that can be instantaneously drawn from the battery by a matched load. It is therefore intimately related to the battery's age, size, condition, and state-of-charge.

As further shown in the patent application referred to above, dynamic power is linearly related to the reciprocal dynamic resistance of the battery, $(1/R_s)$, measured with a small, time-varying, signal of appropriate frequency. This relationship is written $$P_d = (V_o^2/4)\, G_s \quad \text{Watts} \tag{1}$$

where $G_s = 1/R_s$ represents the battery's dynamic conductance, and $V_o$ is the battery's unpolarized open-circuit voltage. With lead-acid batteries, $V_o$ varies by less than 5 percent from 2.0 volts per cell. Thus, for simplicity, $V_o$ can be assumed constant and equal to 12 volts for conventional six-cell automotive-type batteries.

Two embodiments of an electronic battery testing device were disclosed in the above referenced patent applications. Each embodiment employed a small, time-varying signal to sense and measure $G_s$ and yielded an indication of this measurement that was substantially proportional to $G_s$. Equation (1) above was then used to determine the magnitude and scale of an indicating device relating this quantitative indication of measurement to the battery's ability to deliver power to a load.

The invention described herein is an improved electronic battery testing device based on an extension of the principle just enumerated. Two embodiments of the invention are described below. With each embodiment, two variable resistance elements are preset at values dictated by the battery's electrical rating and temperature. As in the earlier invention, a small, time-varying signal is applied to the battery under test, which is used in sensing and measuring $G_s$. Each embodiment, instead of displaying a quantity proportional to the measured value of $G_s$ displays to the viewer, an indication of whether $G_s$ is greater, or less, than a particular critical value, $G_s'$, determined by the settings of two variable elements. Thus, the present invention qualitatively assesses the battery's capability by indicating whether or not it possesses sufficient dynamic conductance to supply a critical value of dynamic power $P_d'$ whose numerical value, $$P_d' = (V_o^2/4) \, G_s' \quad \text{Watts,} \tag{2}$$

is representative of the battery's rating and temperature.

Electrical ratings of automotive-type batteries are defined in SAE Standards J537. In general, these ratings specify performance standards under conditions of various forms of static discharge. For example, the Cold Cranking Current Rating (CCCR) is defined to be the rated current in amperes that can be drawn from a battery at 0°F for 30 seconds while maintaining a terminal voltage of at least 7.2 volts. Similarly, the Ampere-Hour Rating (AHR) is equal to twenty times the rated current in amperes that can be drawn from a battery at 80°F for 20 hours while maintaining a terminal voltage of at least 10.5 volts.

To these static ratings, the Dynamic Power Rating (DPR) of the battery may be added. Let $G_s''$ be the rated 100 $H_z$ dynamic conductance of the battery at a temperature of 80°F. The DPR of the battery is defined as $$DPR = (V_o^2/4) \, G_s'' \quad \text{Watts} \tag{3}$$

where $V_o = 12.0$ for automotive-type, lead-acid batteries.

Extensive measurements on automotive batteries have shown a high degree of correlation between the dynamic power at 80°F and either the measured ampere-hour capacity or the measured cold cranking current. As a result of these measurements, the following two linear equations have been found to accurately relate static and dynamic ratings:

$$DPR = 70x \, (AHR) \quad \text{Watts} \tag{4}$$

and $$DPR = 714 + 11.15x \, (CCCR) \quad \text{Watts.} \tag{5}$$

By using Equations (4) and (5), the DPR of a battery can be determined if either its AHR or its CCR are known.

The dynamic power of a battery decreases as its temperature decreases. Measurements of $P_d$ of many automotive-type batteries have shown that this variation is independent of the size of the battery and closely follows a "universal curve". The empirical relation between dynamic power at an arbitrary temperature T and that at 80°F can be written $$P_d(T)/P_d(80°) = K(T) \tag{6}$$

where $K(T)$ is plotted in FIG. 1 and is expressed in terms of temperature measured in degrees Fahrenheit. FIG. 1 discloses that the temperature factor $K(T)$ varies fairly rapidly at low temperatures and tends toward saturation for T larger than about 50°F.

By establishing a pass-fail criterion for dynamic power, the critical value, $P_d'$, can be related to the battery's electrical rating and temperature. Accordingly, it is established that in order to be considered passing, a battery must be capable of supplying 75 percent of its DPR corrected to the appropriate temperature. Thus, in terms of DPR, the critical value, $P_d'$, of equation (2) is written $$P_d' = (¾) \times K(T) \times (DPR) \quad \text{Watts.} \tag{7}$$

This pass-fail criterion can also be written in terms of Ampere-Hour Rating AHR and Cold Cranking Current Rating CCCR by applying Eqs. (4) and (5). The results are $$P_d' = (52.5) \times K(T) \times (AHR) \quad \text{Watts} \tag{8}$$

and $$P_d' = K(T) \times [536 + 8.38 \times (CCCR)] \quad \text{Watts.} \tag{9}$$

Equations (7), (8) and (9) show that the critical value, $P_d'$ is linearly related to the appropriate battery rating units at any given temperature. Two embodiments of my invention are described below. An important feature of both embodiments is the fact that the setting of the variable resistance element associated with the battery rating is likewise linearly related to the critical value, $G_s'$. Thus, a linear variable resistance element can be linearly calibrated in battery rating units. This feature is highly desirable from the standpoint of both convenience and accuracy.

Consider the simplified schematic diagram of the first embodiment shown in FIG. 2. An adjustable time-varying current source causes $i_o(t)$ to pass through the battery by means of contacts ⓐ and ⓑ. The resulting time-varying voltage developed across the battery, $v_1(t)$, is sensed at separate contacts ⓒ and ⓓ and amplified by an amplifier having adjustable incremental voltage gain A and infinite input impedance. The resulting output voltage $v_2(t)$ is then detected and displayed on an ac voltmeter providing an output indication $|v_2|$ that is proportional to the amplitude of $v_2(t)$.

From FIG. 2, it will be observed that $$|v_2| = A\ |v_1| = [A\ |i_o|]\ R_s. \tag{10}$$

By virtue of the separate contacts for conducting $i_o(t)$ and for sensing $v_1(t)$, this measurement is unaffected by any spurious contacts resistances at ⓐ and ⓑ. Further, since the amplifier's input impedance is assumed infinite, spurious resistances at contacts ⓒ and ⓓ will not affect the measurement.

Equation (10) shows that the voltmeter indication is proportional to $R_s$ rather than to $G_s = 1/R_s$ as would be desired for an electronic battery testing device. Thus, the quantitative indication provided by the output voltmeter is not suitably related to the power delivering capability of the battery.

Assume, however, that the output voltmeter simply indicates whether $|v_2|$ is greater, or less, than a particular critical value $|v_2|'$. Further, let $|i_o|$ be fixed and let the adjustable amplifier gain corresponding to the output indication $|v_2|'$ be denoted $A^*$. Then, from Eq. (10)

$$A^* = \left\{\frac{|v_2|}{|i_o|}\right\} G_s$$

showing that $A^*$ is proportional to $G_s = 1/R_s$ since the bracketed quantity is constant. The configuration of FIG. 2 can therefore be employed as an electronic battery testing device by providing the amplifier — or alternatively the time-varying current course $i_o(t)$ — with a variable attenuator that can be adjusted to bring the output voltage to a prescribed critical value. A measurement of the battery power delivering capability is then indicated quantitatively by the attenuator setting under this condition. A linear attenuator can, e.g., be linearly calibrated in watts according to Equation (1).

By calibrating the amplifier attenuator in battery rating units and the current source attenuator in temperature, or vice-versa, the configuration of FIG. 2 can further be used as an improved electronic battery testing device providing pass-fail information based on battery rating and temperature. Let $A'$ and $|i_o|'$ denote fixed values of $A$ and $|i_o|$ as determined by the battery's rating and temperature, respectively. Further, let $G_s'$ be the critical value of $G_s$ that yields output indication $|v_2|'$ with $A = A'$ and $|i_o| = |i_o|'$. Then, from Eq. (10)

$$A'\ |i_o|' = [\ |v_2|'\ ]\ G_s' \tag{12}$$

where the bracketed quantity is constant.

The actual output voltmeter reading, $|v_2|$, will be less than, or greater than, the critical value $|v_2|'$ according to whether $G_s$ is greater than or less than, the critical value $G_s'$. Thus, if the conditions $|v_2| < |v_2|'$ is denoted pass and $|v_2| > |v_2|'$ is denoted "fail", the output voltmeter will, in fact, indicate whether or not the battery has sufficient $G_s$ to supply the critical value of Dynamic Power, $P_d'$. Since the actual reading of the voltmeter is not material, any display means capable of denoting two qualitative conditions — such as, e.g., two audible tones or two differently colored light — could alternatively be employed.

Eliminating $P_d'$ and $G_s'$ from Equations (2), (7), and (12) leads to $$A'\ |i_o|' = [(3/V_o^2)\ |v_2|'] \times (DPR) \times K(T) \tag{13}$$

where the bracketed quantity is constant. Equation (13) shows that $A'$ is proportional to the battery's DPR (or, alternatively AHR or CCCR) and $|i_o|'$ is proportional to $K(T)$. The linear relationship between $A'$ and the battery rating is a highly desirable feature of this invention. Unfortunately, however, as Equation (10) shows, $|v_2|$ is inversely related to $P_d$ with this embodiment. Confusion may result because the output meter would indicate pass at lower readings than fail. Although several measures could be taken to minimize confusion — such as, e.g., inverting the output voltmeter — the problem is avoided completely in the preferred embodiment described below.

Consider the preferred embodiment of the invention indicated schematically in the simplified diagram of FIG. 3. The time-varying battery voltage is sensed at contacts ⓒ and ⓓ. A series combination of this voltage and an adjustable time-varying voltage source $e_o(t)$ is capacitively coupled to the differential input of amplifier $A_1$. The output current of amplifier $A_1$, $i_1(t)$, is then fed back through resistance $R_1$ and passed through the battery by means of contacts ⓐ and ⓑ. The output voltage of amplifier $A_1$ is sensed across resistance $R_1$ and is capacitively coupled to the differential input of amplifier $A_2$ through variable resistance $R_2$. Amplifier $A_2$ has output current $i_2(t)$ which is fed back and passed through variable resistance $R_2$. An ac milliameter provides an output indication that is proportional to $|i_2|$, the amplitude of $i_2(t)$.

In order to simplify analysis, the two differential amplifiers, $A_1$ and $A_2$, are theoretically assumed to have infinite incremental gain and infinite input impedance. In view of the assumed infinite gain, the total time-varying voltage across the input to amplifier $A_1$ is zero. Thus, since the input impedance to amplifier $A_1$ is infinite, $$-R_s\ i_1(t) + e_o(t) = 0. \tag{14}$$

Likewise, by applying the same reasoning to the input to amplifier $A_2$ $$R_1 i_1(t) + R_2 i_2(t) = 0. \tag{15}$$

Eliminating $i_1(t)$ between Eqs. (14) and (15) leads to $$|i_2| = [R_1\ |e_o|/R_2]\ G_s \tag{16}$$

showing that the output indication is proportional to $G_s = 1/R_s$, and hence to $P_d$, with this preferred embodiment.

By adjusting $|e_o|$ it may be made equal to the preset value $|e_o|'$ as determined by the battery temperature and by adjusting $R_2$ it may be made equal to the preset value $R_2'$ as determined by the battery rating. Further, let $G_s'$ denote the critical value of $G_s$ that yields critical output indication $|i_2| = |i_2|'$ under these conditions. Then from Eq. (16)

$$R_2'/|e_o|' = [R_1/|i_2|'] G_s' \quad (17)$$

Eliminating $G_s'$ and $P_d'$ from Eqs. (2), (7) and (17) leads to $$R_2'/|e_o|' = [(3/V_o^2) R_1/|i_2|'] \times (DPR) \times K(T) \quad (18)$$

where the bracketed quantity is constant. Equation (18) shows that $R_2'$ is proportional to $(DPR)$ and $|e_o|'$ is inversely proportional to $K(T)$. These results are used to calculate values in Tables I and II below.

The inverse relationship between $|e_o|'$ and $K(T)$ is of no particular consequence because $K(T)$ varies by less than a factor of two in normal usage (see FIG. 1). The linear relationship between $R_2'$ and DPR is a desirable feature; however, since it permits linear calibration of $R_2$ in battery rating units as discussed above. In addition, Equation (16) shows that the output indication $|i_2|$ varies linearly with $G_s$. This is also a very desirable feature since it avoids the problems inherent with the first embodiment and permits linear calibration of the output meter in comparative units (such as, e.g., "percentage of rated power") which show the relative capability of the battery to supply the critical power $P_d'$.

The circuit of FIG. 3 is highly insensitive to the deleterious effects of spurious resistance at any of the four contacts. By virtue of the assumed infinite gain of amplifier $A_1$, Equation (14) is satisfied by $i_1(t)$ regardless of any spurious resistances existing at contacts ⓐ and ⓑ. The input signal to amplifier $A_2$ is sensed across $R_1$ and rather than across the output of amplifier $A_1$. This signal is therefore proportional to $i_1(t)$ and is similarly uneffected by any resistances at contacts a and ⓑ. Likewise, spurious resistances at contacts ⓒ and ⓓ will have no effect because of the assumed infinite input impedance of amplifier $A_1$. Thus, in the theoretical circuit of FIG. 3, spurious contact resistance will have no effect whatsoever upon the measurements.

Referring now to FIG. 4, the improved electronic battery testing device is contained generally in a housing 26. The device shown in FIG. 4 is temporarily connected to the battery 1 by means of two double-contact spring clips of the type disclosed in continuation application, Ser. No. 334,667, filed Feb. 22, 1973. One clip, identified by red markings, contacts the positive (+) terminal 2 of battery 1 at diametrically opposed contact areas 4 and 6. Another clip, identified by black markings, contacts the negative (−) terminal 8 at dimetrically opposed contact areas 10 and 12. Red wires 14 and 16 leading from contacts 4 and 6, respectively, are channeled to hoursing 26 through flexible vinyl tubes 18, 20, respectively. Similarly, black wires 22 and 24 leading from contacts 10 and 12, respectively, are channeled to housing 26 through flexible vinyl tubes 18 and 20, respectively. Each vinyl tube contains both a black wire and a red wire which are twisted together to minimize inductance.

With the battery thus connected, pointer knob 28 is adjusted to the battery temperature designated on circumferential scale 30. Likewise, pointer knob 32 is adjusted to the battery rating designated on circumferential scale 34. The needle of meter 36 then moves to a fail area 38 or a pass area 40 depending upon the battery's temperature, rating, and actual dynamic power. In addition, scale markings 42 on meter 36 may indicate the battery's relative capability to deliver rated power at the appropriate temperature.

A complete schematic diagram of a preferred embodiment designed especially to test 12-volt batteries is shown in FIG. 5. A 100 Hz square wave is generated by a conventional multi-vibrator circuit consisting of two pnp transistors 50 adn 52, having a pair of base resistors 54 and 56, a pair of collector resistors 58 and 60, and a pair of feedback capacitors 62 and 64. The dc power supplied to the multivibrator is obtained from the battery undergoing test by means of red wire 14 and black wire 22 and is voltage-regulated by means of a zener diode 66 along with a dropping resistor 68. The purpose of regulating the multivibrator's supply voltage is to maintain its time-varying output signal constant although the battery voltage changes due to polarization.

A high-gain differential amplifier follows the multivibrator and consists of an integrated circuit operational amplifier 70 followed by a *pnp* transistor 72 and a *npn* power transistor 74. All three of these semiconductor devices obtain their reguisite dc powers from the battery undergoing test through positive red lead 16 and negative black lead 24. A diode 76 inserted in the negative supply lead prevents damage to operational amplifier 70 as well as to other semiconductors when the battery connection is inadvertently reversed.

The dc common mode operating point of the input to operational amplifier 70 is established at the mid-point of the battery voltage by a pair of equal voltage-divider resistors 78 and 80 along with a pair of biasing resistors 82 and 84. Direct-current feedback from the output of power transistor 74 to the non-inverting (+) input of operational amplifier 70 is provided by a pair of voltage divider resistors 86 and 88 along with two feedback resistors 90 and 92. Because of the 180° phase shift provided by transistor 72, the resulting dc feedback is negative. Alternating current is attenuated in the dc feedback path by capacitor 94 along with resistor 96. The purpose of dc feedback is to stabilize the operation of the over-all amplifier under various conditions of temperature and circuit parameters and to fix the operating point of transistor 74. The dc operating point of transistor 72 is established by the drop across diode 98 which is forward biased by the current through resistor 100.

The time-varying output of the multivibrator, $e_o(t)$, is developed across the series combination of a fixed resistor 102 and a variable resistor 104. Variable resistor 104 is connected to pointer knob 28 of FIG. 4 and is set to the battery temperature. Calibration of scale 30 associated with variable resistor 104 is given below. The voltage developed across the series combination of resistors 102 and 104 is attenuated by trimmer potentiometer 106 whose function is to provide means to initially calibrate the battery testing device. The setting of trimmer potentiometer 106 selects the particular percentage of rated power which corresponds to the pass-fail criterion. (See Eq. 7).

The time-varying output of trimmer potentiometer 106 is connected in series with the time-varying voltage developed across the dynamic resistance of the battery 108 as sensed through black wire 22 and red wire 14. The series ac loop at the operational amplifier input is completed by red wire 14 and capacitor 110 connected from the battery to the inverting (−) input, and by capacitor 112 and resistor 114 connected from trimmer potentiometer 106 to the non-inverting (+) input of operational amplifier 70.

A time-varying current, $i_1(t)$, from the output of power transistor 74 is fed back to dynamic resistance 108 through power resistor 116, black wire 24, and red wire 16. In view of the polarity of the input of operational amplifier 70 and the phase reversal provided by transistor 72, this time-varying current constitutes negative feedback just as is shown in FIG. 3. Power resistor 116 thus corresponds to $R_1$ of FIG. 3. In addition, resistor 116 provides a path for the dc emitter current of power transistor 74 which operates as a class-A emitter follower.

The time-varying voltage developed across resistor 116 is applied to the differential input of another operational amplifier 118 by means of a capacitor 120 and the very small ac impedances for forward biased diode 76 and a zener diode 122 along with a fixed resistance 124 and a variable resistance 126. Zener diode 122 is biased by a resistor 128 and its voltage drop establishes the dc common mode operating point of the non-inverting (+) input of operational amplifier 118 by means of a bias resistor 130. Fixed resistance 124 and variable resistance 126 correspond to $R_2$ of FIG. 3. Variable resistance 126 is thus connected to pointer knob 32 of FIG. 4 and is set to the battery rating. Calibration of scale 34 associated with variable resistor 126 as given below. A negative feedback path for $i_2(t)$ is provided from the output of amplifier 118 to resistances 124 and 126 through a dc milliameter 132.

The power supplied to operational amplifier 118 at terminals V+ and V− has the form of square pulses synchronized with the 100 Hz multivibrator output. This synchronization is accomplished by the combination of a pair of switching transistors 134 and 136 along with a triggering transistor 138, a pair of bias resistors 140 and 142, and a wave shaping network composed of resistor 144 in parallel with capacitor 146. Operational amplifier 118 is functional only during the alternate half cycles when transistor 52 conducts and current will pass through meter 132 only during these alternate half cycles of multivibrator operation. This mode of operation results in half-wave rectification of the amplified multivibrator output. Noise, or other spurious signals, that are not correlated with $e_o(t)$ will produce alternating current but not direct current through dc milliameter 132. Thus, "synchronous" detection occurs and produces an output indication that is proportional to the amplitude of the amplified multivibrator output signal while rejecting all other uncorrelated signals. An alternative detecting circuit would utilize a continuously powered operational amplifier with diode rectifiers in the feedback path. This simple circuit, however, would not reject spurious signals uncorrelated with the multivibrator output.

A list of component types and values for the preferred embodiment of the improved electronic battery testing device follows:

| REFERENCE NO. | COMPONENT |
|---|---|
| Semiconductor Devices | |
| 70, 118 | µA-741 I.C. Operational Amplifiers |
| 50, 52, 72, 134 | 2N5138 transistors (pnp) |
| 136, 138 | 2N3392 transistors (npn) |
| 74 | 2N1711 power transistor (npn) |
| 66 | 1N751A Zener diode |
| 122 | 1N753A Zener diode |
| 76, 98 | 1N55 diodes |
| Resistors | (½watt; 10% tolerance unless specified) |
| 102 | 8.2Ω–5% |
| 124 | 200Ω–5% |
| 100, 128 | 300Ω |
| 78, 80 | 1 K |
| 68 | 1.5 K |
| 96, 114 | 3.3 K |
| 86 | 10 K |
| 88 | 33 K |
| 58, 60, 82, 84, 130, 142 | 47 K |
| 140, 144 | 100 K |
| 54, 56, 90, 92 | 1 M |
| 116 | 25Ω–3 Watt |
| 106 | 500Ω–trimmer pot.-linear taper |
| 104 | 5Ω variable resistor-linear taper |
| 126 | 500Ω variable resistor-linear taper |
| Capacitors | |
| 146 | 0.003 µfd |
| 62, 64 | 0.0068 µfd |
| 110, 120 | 0.1 µfd |
| 94, 112 | 0.47 µfd |
| Meter | |
| 132 | dc milliameter 1 MA full scale |

Calibration of the two scales, 30 and 34, associated with the temperature adjustment resistance 104 and with the rating adjustment resistance 126 are given below in Tables I and II, respectively. Table I was calculated from the empirical temperature correction factor of FIG. 1 and the fact that according to Eq. (18), the sum of resistances 102 and 104 must be proportional to $1/K(T)$. Table II was calculated from Eqs. (4) and (5) and the fact that the sum of resistances 124 and 126 is proportional to DPR according to Eq. (18). Both Table I and Table II assume that $\theta = 300°$ corresponds to full clockwise rotation of the appropriate variable resistance.

Table I

Calibration of the 5 - ohm "Temperature Admustment" Variable Resistance (104).

| T (Degrees F) | K(T) (Relative Units) | R (Ohms) | Θ (Degrees) |
|---|---|---|---|
| −20 | 0.65 | 4.88 | 7 |
| −10 | 0.71 | 3.77 | 74 |
| 0 | 0.77 | 2.84 | 130 |
| 10 | 0.82 | 2.17 | 170 |
| 20 | 0.87 | 1.57 | 206 |
| 30 | 0.91 | 1.14 | 232 |
| 50 | 0.96 | 0.65 | 261 |
| 80 | 1.0 | 0.30 | 282 |

Table II

Calibration of the 500 ohm "Rating Adjustment" Variable Resistance (126).

| CCCR Amps) | AHR (Amp-Hours) | DPR (Watts) | R (ohms) | Θ (Degrees) | |
|---|---|---|---|---|---|
| 11 | 150 | | 2400 | 19 | k32 |
| 42 | 200 | 40 | 3000 | 69 | |
| 72 | 250 | 47 | 3600 | 120 | |
| 103 | 300 | 54 | 4100 | 171 | |

Table II-Continued

Calibration of the 500 ohm "Rating Adjustment" Variable Resistance (126).

| CCCR (Amps) | AHR (Amp-Hours) | DPR (Watts) | R (ohms) | Θ (Degrees) |
| --- | --- | --- | --- | --- |
| 133 | 350 | 62 | 4700 | 222 |
| 164 | 400 | 69 | 5200 | 273 |
| 195 | 450 | 76 | 5800 | 324 |
| 225 | 500 | 84 | 6400 | 375 |
| 257 | 550 | 92 | 7000 | 428 |
| 286 | 600 | 99 | 7500 | 477 |

Having thus described my invention, it should be understood that the invention is not limited to the particular applications and disclosure detailed above. In particular, the invention is applicable to the testing of any source of dc electrical power such as, e.g., primary batteries, solar batteries, thermionic generators, MHD generators, fuel cells, and thermo-electric generators as well as storage batteries. Other alternative designs will be apparent to one who is skilled in the electronic art, and it is intended to cover in the appended claims, such applications and variations falling within the true scope of this invention.

What is claimed is:

1. An electronic device for providing a qualitative assessment of the capacity of a direct current source of electricity to supply power to a load comprising:
   a. electrical means providing a time-varying signal;
   b. amplifying means for amplifying signals derived from a time-varying voltage developed across said direct current source of electricity,
   c. at least two electrical connecting means constructed and arranged for interconnecting said amplifying means, said electrical means and said direct current source of electricity, said connecting means conducting a time-varying current derived from said time-varying signal through said direct current source and sensing said time-varying voltage developed across said direct current source of electricity;
   d. display means operably connected to said amplifying means, said display means constructed and arranged to denote first and second qualitative conditions of said direct current source of electricity according to whether the output signal amplitude of said amplifying means is greater or less than a particular critical value; and
   e. settable control means for varying said output signal amplitude of said amplifying means relative to said particular critical value in accordance with the electrical rating of said direct current source of electricity, the relative setting of said settable control means linearly related to the reciprocal dynamic resistance of said direct durrent source at the level at which said output signal amplitude equals said particular critical value.

2. Apparatus as set forth in claim 1 including second settable control means for varying said output signal amplitude of said amplifying means relative to said particular critical value in accordance with the temperature of said direct current source of electricity.

3. Apparatus as set forth in claim 1 wherein said electrical means providing a time-varying signal and said amplifying means receive operating power from said direct current source of electricity.

4. Apparatus as set forth in claim 1 wherein each of said electrical connecting means contains both a first conductor and a second conductor separately contacting each output terminal of said direct current source, a pair of said first conductors conducting said time-varying current and a pair of said second conductors sensing said time-varying voltage developed across said direct current source of electricity.

5. Apparatus as set forth in claim 1 wherein said display means includes a meter having scale markings indicating the relative ability of said direct current source to supply rated power.

6. Apparatus as set forth in claim 1 wherein said electrical rating is specified in "watts".

7. Apparatus as set forth in claim 1 wherein said electrical rating is specified in "ampere-hours".

8. Apparatus as set forth in claim 1 wherein said electrical rating is specified in "cold cranking amperes".

9. Apparatus as set forth in claim 3 including voltage regulating means stabilizing the supply voltage of said electrical means providing a time-varying signal.

10. An electronic device for providing a qualitative assessment of the capacity of a direct current source of electricity to supply power to a load comprising:
    a. a time-varying voltage source;
    b. electrical connecting means constructed and arranged to be connected to each terminal of said direct current source of electricity;
    c. first high-gain amplifier means;
    d. first resistor means conducting a time-varying current from the output of said first high-gain amplifier means through said direct current source of electricity by means of said electrical connecting means;
    e. capacitive means coupling across the input of said first high-gain amplifier means, a signal representative of the sum of the output of said time-varying voltage source and the signal developed across said direct current source of electricity as sensed by means of said electrical connecting means;
    f. second high-gain amplifier means;
    g. second resistor means including settable control means for varying the value of said second resistor means according to the electrical rating of said direct current source of electricity;
    h. means capacitively coupling across the input of said second high-gain amplifier means, a signal representative of the sum of signals developed across said first resistor means and said second resistor means;
    i. means feeding back a current from the output of said second high-gain amplifier means to said second resistor means, said current inversely proportional to the dynamic resistance of the direct current source; and,
    j. display means operably connected to said second high-gain amplifier means and actuated by the amplitude of a signal representative of the output signal of said second high-gain amplifier means, said display means constructed and arranged to denote first and second qualitative conditions of said direct current source of electricity according to whether said output signal of said second high-gain amplifier means is greater or less than a particular critical value.

11. Apparatus as set forth in claim 10 including second settable control means for varying the amplitude of the output voltage of said time-varying voltage source according to the temperature of said direct current source of electricity.

12. Apparatus as set forth in claim 10 wherein said electrical rating is specified in watts.

13. Apparatus as set forth in claim 10 wherein said electrical rating is specified in ampere-hours.

14. Apparatus as set forth in claim 10 wherein said electrical rating is specified in cold cranking amperes.

15. Apparatus as set forth in claim 10 wherein said time-varying voltage source, said first high-gain amplifier means, and said second high-gain amplifier means receive operating power from said direct curent source of electricity.

16. Apparatus as set forth in claim 15 including voltage regulating means stabilizing the supply voltage of said time-varying voltage source.

17. Apparatus as set forth in claim 10 wherein said display means includes a meter having scale markings indicating the relative ability of said direct current source to supply rated power.

18. Apparatus as set forth in claim 10 wherein each of said electrical connecting means contains both a first conductor and a second conductor separately contacting each output terminal of said direct current source, a pair of said first conductors conducting said time-varying current through said direct current source of electricity and a pair of said second conductors sensing said signal developed across said direct current source of electricity.

19. Apparatus as set forth in claim 10 wherein the power supplied to said second high-gain amplifier means is interrupted in synchronism with the output signal of said time-varying voltage source.

20. A system for determining whether a direct current supply, having a dynamic impedance, can deliver a rated power to a load including:
a time varying voltage source, coupled to the supply, the source of predetermined amplitude and of a frequency selected to minimize the contribution of supply reactance to dynamic impedance,
a current generating means coupled to the supply and producing an output directly proportional to the time varying source and inversely proportional to the dynamic resistance,
means for sensing the current generating means and producing an output responsive thereto, and
display means including means to scale the sensing means output according to a selected rated output, and displayably comparing the scaling means output with the selected power rating.

21. The system as set forth in claim 20 further comprising means for predeterminedly fixing the level of the source in response to a selected supply temperature.

22. A pass-fail testing means for determining whether or not a direct current source can supply a rated power to a load including: power determining means having
a. an alternating current excitation means,
b. means coupling the excitation meand to the source,
c. means sensing the response of the source to the excitation means and producing an output signal in accordance with to the ratio of source a.c. current to source a.c. voltage,
d. means for processing the sensing means output and producing an output representative of the relative power delivering capability of the source, settable control means programmable to predeterminedly control the power determining means in response to a selected source power rating, and display means monitoring the processing means and producing an output representative of the qualitative condition of the source.

23. The testing means of claim 22 wherein the control means is further programmable to predeterminedly control the power determining means in response to a selected source temperature.

* * * * *

UNITED STATES PATENT AND TRADEMARK OFFICE
CERTIFICATE OF CORRECTION

PATENT NO. : 3,909,708
DATED : September 13, 1975
INVENTOR(S) : Keith S. Champlin It is certified that error appears in the above-identified patent and that said Letters Patent are hereby corrected as shown below:

Col. 1, line 39, change "pass-fail" to --"pass-fail"--.

Col. 1, line 53, change "pass-fail" to --"pass-fail"--.

Col. 1, line 65, change "providess" to --provides--.

Col. 2, line 2, change "valve" to --value--.

Col. 4, line 6, change "CCR" to --CCCR--.

Col. 5, line 11, change "contacts" to --contact--.

Col. 5, line 30, change "$|V_2|$" to --$|V_2|'$--.

Col. 5, line 30, after the equation insert --(11)--.

Col. 6, line 1, change "light" to --lights--.

Col. 6, line 50, change "$A_2$" to -- $A_2^-$ --.

Col. 7, line 35, delete "and".

Col. 7, line 38, change "a" to -- ⓐ --.

Col. 7, line 54, change "dimetrically" to --diametrically--.

Col. 7, line 56, change "hoursing" to --housing--.

Col. 7, line 57, change "18, 20" to -- 18 and 20--.

Col. 8, line 10, change "adn" to --and--.

UNITED STATES PATENT AND TRADEMARK OFFICE
CERTIFICATE OF CORRECTION

PATENT NO. : 3,909,708  
DATED : September 13, 1975  
INVENTOR(S) : Keith S. Champlin It is certified that error appears in the above-identified patent and that said Letters Patent are hereby corrected as shown below:

Col. 8, line 25, change "reguisite" to --requisite--.

Col. 9, line 19, change "for" to --of--.

Col. 10, line 23, change "0.003" to --0.0033--.

Col. 10 and Col. 11, Table II should be retyped as follows:

Calibration of the 500 ohm "Rating Adjustment" Variable Resistance (126).

| CCCR (Amps) | AHR (Amp-Hours) | DPR (Watts) | R (Ohms) | Θ (Degrees) |
|---|---|---|---|---|
| 150 | 32 | 2400 | 19 | 11 |
| 200 | 40 | 3000 | 69 | 42 |
| 250 | 47 | 3600 | 120 | 72 |
| 300 | 54 | 4100 | 171 | 103 |
| 350 | 62 | 4700 | 222 | 133 |
| 400 | 69 | 5200 | 273 | 164 |
| 450 | 76 | 5800 | 324 | 195 |
| 500 | 84 | 6400 | 375 | 225 |
| 550 | 92 | 7000 | 428 | 257 |
| 600 | 99 | 7500 | 477 | 286 |

Col. 13, line 5, change "watts" to --"watts"--.

Col. 13, line 7, change "ampere-hours" to --"ampere-hours"--.

Col. 13, line 9, change "cold cranking amperes" to --"cold cranking amperes"--.

UNITED STATES PATENT AND TRADEMARK OFFICE
CERTIFICATE OF CORRECTION

PATENT NO. : 3,909,708
DATED : September 13, 1975
INVENTOR(S) : Keith S. Champlin It is certified that error appears in the above-identified patent and that said Letters Patent are hereby corrected as shown below:

Col. 14, line 20, change "meand" to --means--.

Col. 14, line 24, delete "to".

Col. 5, line 63, change "pass" to --"pass"--.

Col. 6, line 17, change "pass" to --"pass"--.

Col. 6, line 17, change "fail" to --"fail"--.

Col. 8, line 1, change "fail" to --"fail"--.

Col. 8, line 1, change "pass" to --"pass"--.

Col. 14, line 28, subclause d should not extend to the end of the claim but only to the comma in line 28. The word "settable" should then begin a new paragraph.

Col. 10, Table I, parenthesis should be placed before the word "ohms" in the top of Table I.

Signed and Sealed this thirtieth Day of March 1976

[SEAL]

Attest:

RUTH C. MASON
Attesting Officer

C. MARSHALL DANN
Commissioner of Patents and Trademarks